June 3, 1930.  C. W. DIETRICH  1,760,937
STORAGE BATTERY INDICATOR
Filed Aug. 24, 1928  2 Sheets-Sheet 1
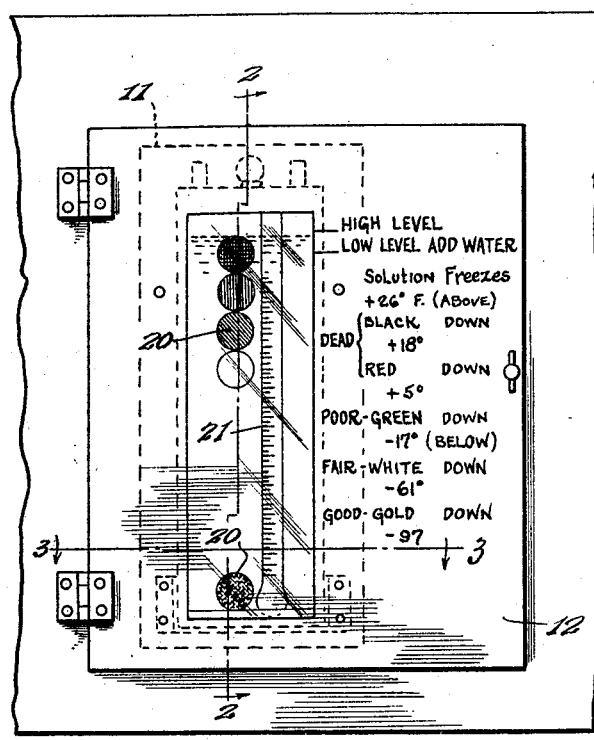

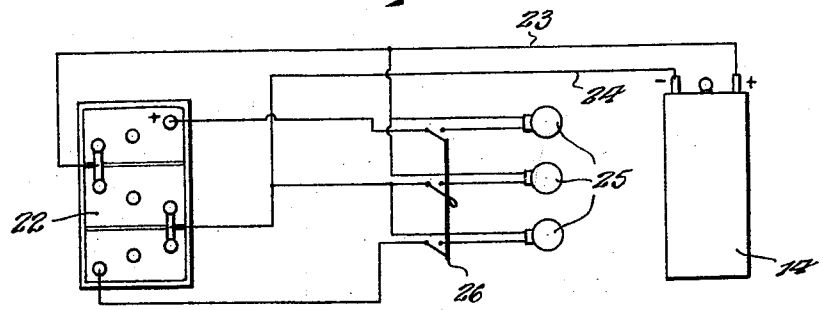
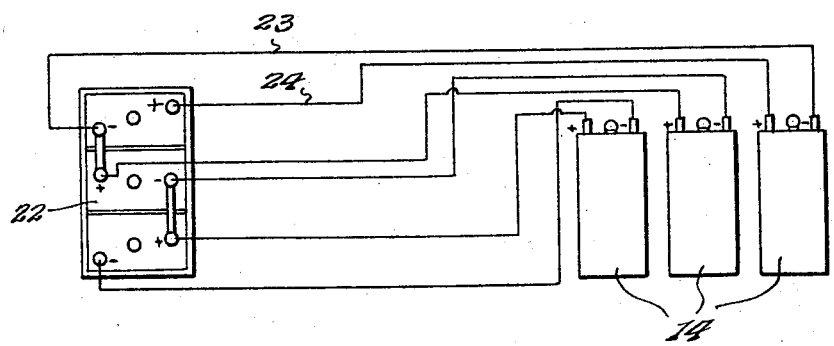
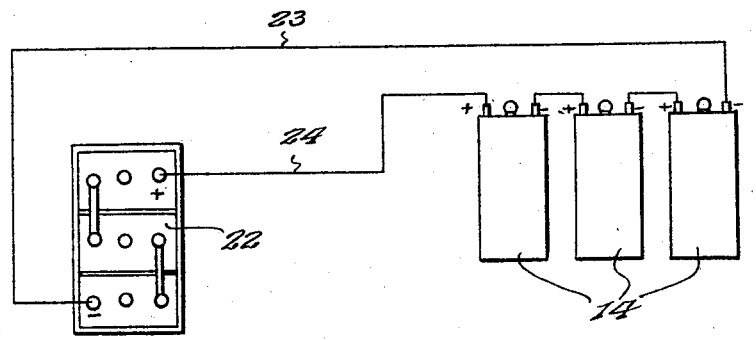

Patented June 3, 1930

1,760,937

UNITED STATES PATENT OFFICE

CARL W. DIETRICH, OF NORTH BERGEN, NEW JERSEY

STORAGE-BATTERY INDICATOR

Application filed August 24, 1928. Serial No. 301,792.

Storage batteries are generally located so as to be out of the way and in consequence are not under observation and are not readily accessible and some inconvenience is experienced when it is desired to ascertain their condition.

Therefore one of the main features of the present invention is to devise indicating means which may be conveniently positioned and under constant observation to apprise one of the abnormal conditions tending to detract from the efficiency or life of the battery, so that steps may be taken to remedy the difficulty and thereby avoid shortening the period of service and impairment of the action of the battery.

The invention contemplates a small indicating battery electrically connected to the main or working battery and adapted to be mounted upon the instrument board, dash or other convenient part of the motor vehicle, air craft, vessel, or other form of carrier, to designate high or low specific gravity of the electrolyte, the approximate level thereof and the point at which the same will freeze, also the overcharging of the battery.

While the drawing illustrates a preferred embodiment of the invention, it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which:—

Figure 1 is an elevational view of a storage battery indicator embodying the invention.

Figure 2 is a detail sectional view on the line 2—2 of Figure 1.

Figure 3 is a horizontal sectional view on the line 3—3 of Figure 1.

Figure 4 is a vertical sectional view on the line 4—4 of Figure 3 looking in the direction of the arrows.

Figure 5 is a schematic view illustrating the circuits.

Figure 6 is a view showing a separate indicator for each cell of the storage battery.

Figure 7 shows an indicator for each cell of the battery but connected in series and paralleled with the terminals of the storage battery.

Corresponding and like parts are referred to in the following description and designated in the several views of the drawing by like reference characters.

The numeral 10 denotes a support for the indicator and the same may consist of an instrument board, dash, panel or other convenient part of a motor vehicle, air craft, vessel or carrier to which the invention may be applied.

The numeral 11 designates an opening in the support 10 and this opening is closed by means of a door 12 to which the indicator is fitted. As shown most clearly in Figures 2 and 3 of the drawings the indicator is arranged upon the rear side of the door 12, so as to be out of the way, and is readily observable through an opening formed in the door and which opening is closed by means of a transparent plate 13. The arrangement disclosed results in a disposition of the indicator so as to be out of the way and yet admit of the same being brought into convenient position for addition of water and other attention.

The indicator consists, in effect, of a storage battery in miniature and electrically connected to the main or working storage battery so as to be affected in a like manner and thereby designate the condition of the main battery without necessitating inspection of said main battery to ascertain its condition. The indicator includes a jar 14 and electrodes 15 and 16 of a nature corresponding to the electrodes of the working battery. The electrolyte contained in the jar 14 may be the same as that contained in the cell of the working battery or may be of any nature determined upon. A stepped projection 17 extends from the wall of the jar 14 inwardly to form a support for the electrode 15 and a spacer holding the electrodes 15 and 16 apart.

A mat 18 is placed upon the bottom of the jar 14 and the electrode 16 and thermometer rest thereon. A ball 19 normally rests upon the mat 18 and is one of a series of balls provided to indicate the specific gravity of the electrolyte. A group of balls, designated by the numeral 20, normally occupies a position adjacent the top of the cell, as indicated most clearly in Figure 2 of the drawings. The balls 20 are more buoyant than the ball 19 but vary in flotation, so that the top ball is lighter than the bottom ball and the intermediate balls of varying buoyancy which decreases from the topmost ball to the bottom ball. In consequence of the arrangement the bottom ball will gravitate as the specific gravity of the electrolyte decreases. Upon further reduction of the specific gravity of the electrolyte the ball next to the bottom ball will sink, and so on towards the top ball which will be the last to settle to the bottom of the cell. As the specific gravity of the electrolyte decreases the strength of the battery correspondingly diminishes and the freezing point of the electrolyte rises, and upon reference to the position of the balls and a schedule, or scale, conveniently positioned, the nature of the electrolyte contained in the main battery may be ascertained.

As shown in Figure 1 of the drawings the schedule or scale appears upon the face of the door 12 adjacent the opening closed by the transparent plate 13. It is observed that the same conditions affecting the main or working battery will affect the indicator, hence the level of the electrolyte in the main battery may be ascertained by noting the level of the electrolyte in the cell 14 of the indicator. Any tendency to overcharge the working battery necessarily increases the specific gravity of the electrolyte owing to evaporation of the water and in consequence the ball 19 will be upward thereby giving warning that the battery is overcharging so that proper steps may be taken to obviate this condition which is objectionable and tends to impair the efficiency or life of the battery. A thermometer 21 is placed within the jar 14 to indicate the temperature.

Referring to the schematic views 5, 6 and 7 the numeral 22 designates the main or working storage battery. In these views the numeral 14 denotes the indicator which is electrically connected to the main or working battery 22 by wires 23 and 24. As illustrated in Figure 5 there is one indicator 14 for the three cells of the battery 22. As shown in Figure 6 an indicator 14 is provided for each cell of the battery 22. Figure 7 shows an indicator for each cell of the battery 22 but the indicators are connected in series.

Referring to Figure 5 it is observed that an electric light 25 is provided for each cell of the main battery 22 and these lights are included in independent circuits which are closed by means of a single switch 26. These lights indicate the condition of the several cells of the battery. In case an indicator is connected in parallel with a cell of a battery a cell other than the one the indicator is connected to may go dead and the indicator show a fully or partly charged battery. There will be provided as many lights or bulbs 25 as there are cells in the battery, each bulb being connected to a different cell. Any bulb from about two to about eight volts may be used. By the use of a switch the electric lights are lit, and a bad cell can be very easily detected especially on discharge while battery is being used for lights or to turn the starting motor, etc. By the use of bulbs a dead cell may show up as soon as the switch is turned or thrown, the bulb connected with the dead cell will not be as bright as the others or not light at all. One of the cells may have an internal short circuit and all bulbs light the same when switch is thrown, but as soon as a heavy current is drawn from the battery the light will go out connected to the bad cell. It may even go out and light again and show up brighter than the rest of the bulbs while current is being drawn from the battery. In a case like that it indicates that that cell went dead and reversed, giving a potential opposite to the flow of current or bucking it. Instead of using a bulb for each cell, the dash light bulb can be used, arranged so as to light the bulb with each individual cell of the battery, one at a time. Of course one cell will only show a very small glow owing to the low voltage, but a bad cell can easily be detected, the same as above, the only difference being, in the first method, all cells are tested at once, whereas in the latter one cell is tested at a time with one dim light.

The invention is applicable to storage batteries wherever used as a source of energy for operating any part adapted to be electrically actuated, such as starters, lighting systems, radio receivers and transmitters and the like.

Having thus described the invention, I claim:—

1. The combination with a storage battery, of an indicator to determine condition of electrolyte in said storage battery consisting of a miniature storage battery mounted in position for observation and electrically connected in parallel with the first-mentioned storage battery, and means to indicate the specific gravity of electrolyte in the miniature battery and thereby substantially indicate the specific gravity of electrolyte in said first-mentioned battery.

2. The combination with a storage battery, of an indicator to determine condition of electrolyte in said storage battery consisting of a cell having electrolyte therein and adapted to be mounted at a distance from the battery in position for observation, electrodes in said cell, conductors electrically connecting electrodes of the storage battery in parallel with corresponding electrodes of said cell, and means to indicate the specific gravity of electrolyte in said cell and thereby substantially indicate the specific gravity of electrolyte in said storage battery.

In testimony whereof I affix my signature.

CARL W. DIETRICH. [L. S.]